United States Patent [19]
Whitehouse et al.

[11] 3,770,949
[45] Nov. 6, 1973

[54] ACOUSTIC SURFACE WAVE CORRELATORS AND CONVOLVERS

[75] Inventors: Harper John Whitehouse; Jeffrey M. Speiser, both of San Diego, Calif.

[73] Assignee: The United States of America as represented by the Secretary of the Navy, Washington, D.C.

[22] Filed: Apr. 21, 1972

[21] Appl. No.: 246,346

[52] U.S. Cl. .................. 235/181, 310/8.1, 310/9.8, 333/30
[51] Int. Cl. .................. G06g 7/19, H03h 9/00
[58] Field of Search .................. 235/181; 333/30; 330/5.5; 310/8.1, 9.8

[56] References Cited

UNITED STATES PATENTS

| | | | |
|---|---|---|---|
| 3,675,052 | 7/1972 | Lindsay et al. | 333/30 R X |
| 3,675,163 | 7/1972 | Hartmann et al. | 333/30 R |
| 3,680,007 | 7/1972 | Tseng | 333/30 R |
| 3,459,929 | 8/1969 | Lerwill et al. | 235/181 |

OTHER PUBLICATIONS

Quate–Thompson: Convolution and Correlation in Real Time with Nonlinear Acoustics, Appl. Physics Letters, Vol. 16, No. 12, June, 1970, p. 494–496.

*Primary Examiner*—Felix D. Gruber
*Attorney*—Richard S. Sciascia et al.

[57] ABSTRACT

An acoustic surface wave device comprising a substrate capable of propagating an acoustic wave across its surface and two pairs of electrode structures disposed upon the surface of the substrate, each pair aligned parallel to the direction of wave propagation, one pair aligned parallel to the other. Each of the four electrode structures are adapted for connection to an input electrical signal, which, upon transduction upon the surface of the substrate, causes an acoustic wave to propagate along the surface of the substrate, both acoustic waves being parallel, the acoustic waves generated by the same pair of electrode structures propagating in the same line, either in the same direction or in opposed directions.

Each electrode structure comprises a pair of sets of parallel, interdigitated, electrodes, oriented in a direction perpendicular to the direction of surface wave propagation, and a pair of bus bars, at opposite ends of, perpendicular to, and connecting, the interdigitated electrodes, the other bus bar connecting the remaining electrodes. The four electrode structures are so coded that the sum of the auto correlation functions of the coding is equal to a delta function.

The acoustic surface wave device further comprises a pair of spatial integrators, disposed upon the substrate, one for each parallel pair of electrode structures. One integrator has as its two inputs the surface wave outputs from two of the parallel electrode structures, while the other integrator has as its two inputs the surface wave outputs from the other two parallel electrode structures. Each integrator spatially integrates the signal appearing under it produced by the interaction of the acoustic output of the two electrode structures which provide its two inputs.

A signal summer has as its two inputs the outputs of the pair of integrators, and its output signal corresponds to the convolution or correlation of the two different input signals to the two pairs of electrode structures, a convolution if one input signal is time-reversed with respect to the other, otherwise a correlation.

10 Claims, 6 Drawing Figures

QUARTER-SQUARE TRANSDUCER DEVICE

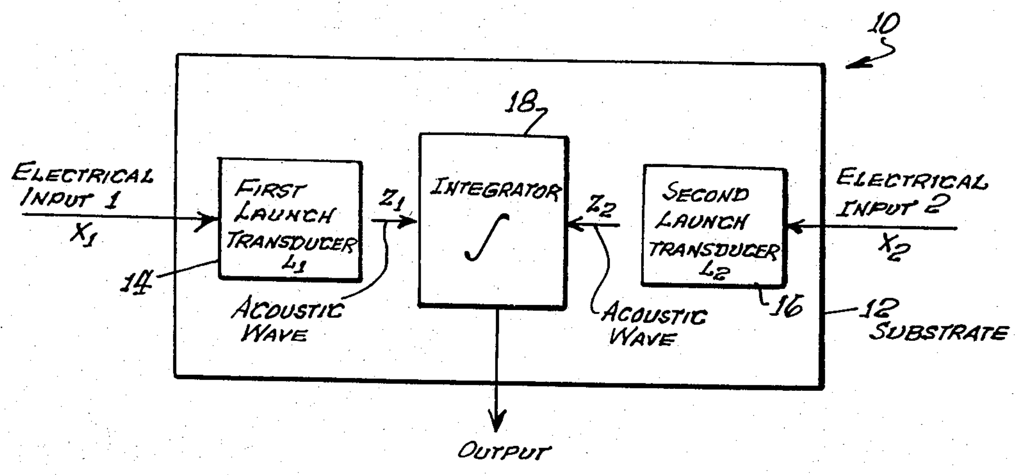
FIG. 1. - (PRIOR ART) BASIC INTERACTION PROCESS
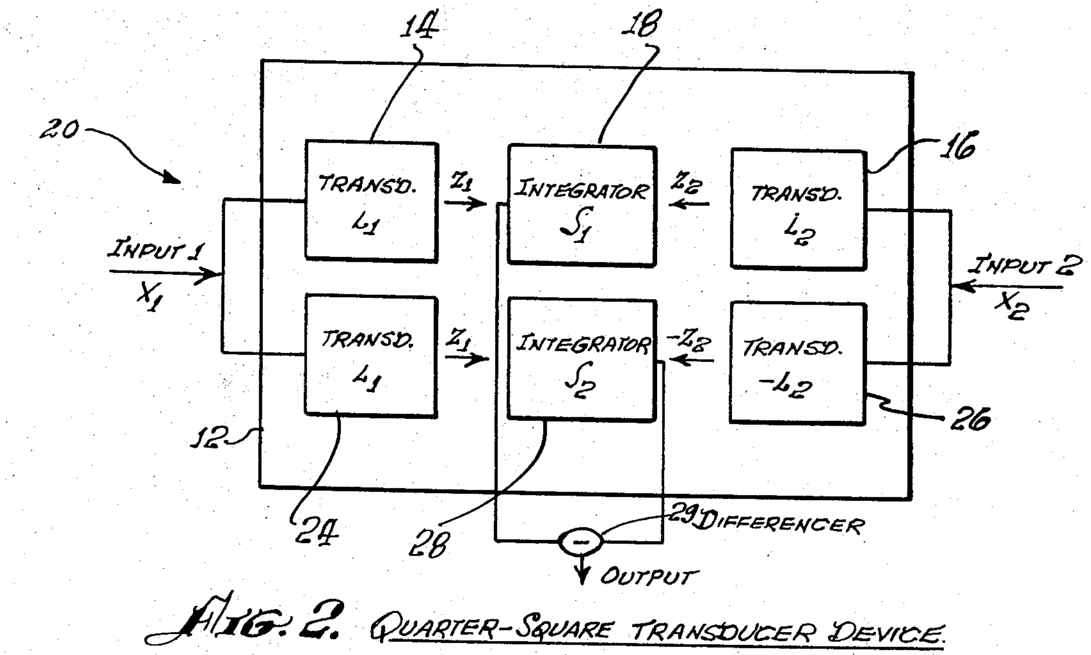
FIG. 2. QUARTER-SQUARE TRANSDUCER DEVICE

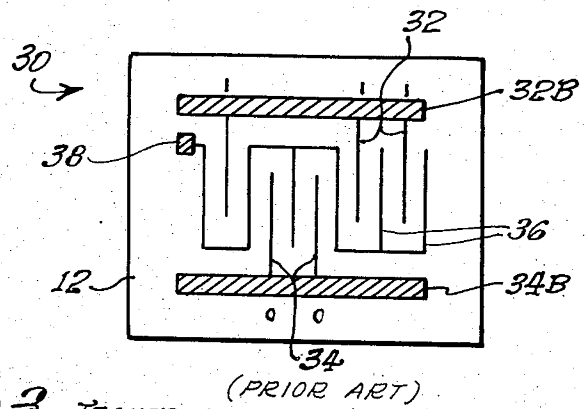
FIG. 3. TRANSDUCER WITH FIELD-DELINEATED ELECTRODES.
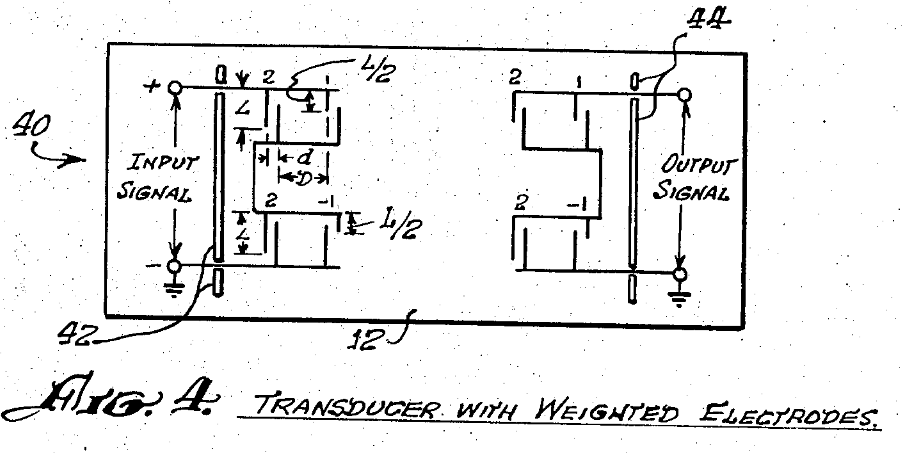
FIG. 4. TRANSDUCER WITH WEIGHTED ELECTRODES.

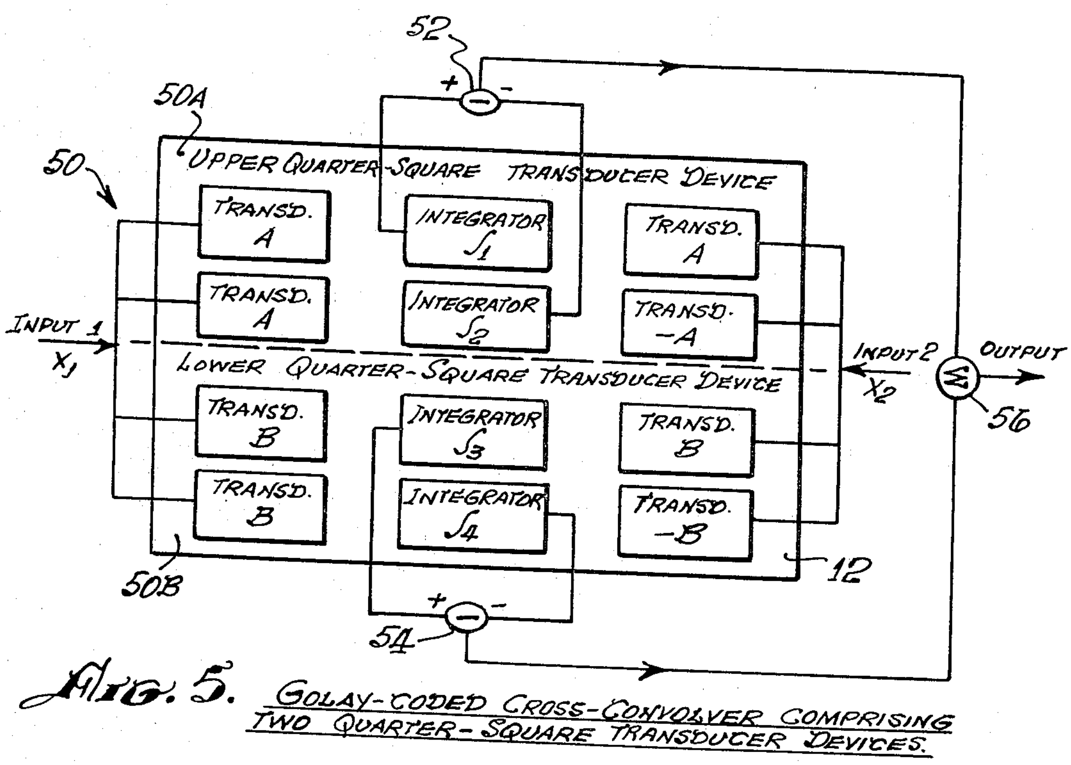
FIG. 5. GOLAY-CODED CROSS-CONVOLVER COMPRISING TWO QUARTER-SQUARE TRANSDUCER DEVICES.
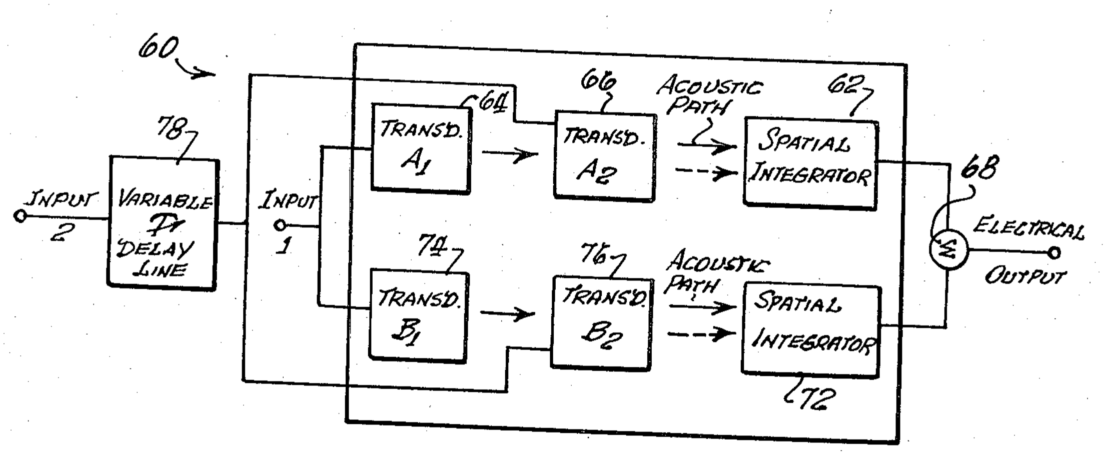
FIG. 6. GENERAL CONFIGURATION OF CORRELATOR TRANSDUCER.

ACOUSTIC SURFACE WAVE CORRELATORS AND CONVOLVERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a composite transducer for use in acoustic correlators and convolvers, useful, for example, for decoding pulse-type signals. When the combination of a stream of pulses in one propagation channel and the coding in that channel matches the combination of the stream of pulses and the coding in another channel, that is, when there is correlation between the two combinations, a maximum output is obtained; otherwise an output signal of a much smaller magnitude is obtained. The composite transducer employs a cancallation of temporal sidelobes to provide the gain of a periodic transducer together with the bandwidth corresponding to the elementary transducers which are combined to make the composite transducer. The transducer further employs a cancellation of spurious voltages ordinarily generated by multiple electric-to-acoustic and acoustic-to-electrical conversions, thus permitting the use of high-coupling materials for transduction.

Acoustic convolvers have been built utilizing a pair of acoustic waves traveling in opposite directions. Typically an acoustic-acoustic interaction or a pair of acoustic-optic interactions are utilized to generate a lagged product of the form $u(ct+x)\ v(ct-x)$. Integrating over the space variable $x$ then gives an output which is a scaled version of the convolution of the two input functions $u$ and $v$. If the two waves are made to travel in the same direction the output is the cross-correlation function of the two inputs, scanned with a speed which depends upon the relative velocity of the two waves.

In the prior art, transducer design has limited either the bandwidth or the output signal-to-noise ratio of such convolvers and correlators. Periodic transducers have provided high output or high output signal-to-noise ratio, but little fractional bandwidth. Simpler transducers have yielded higher fractional bandwidths, but have limited the attainable output signal and the output signal-to-noise ratio.

SUMMARY OF THE INVENTION

In the simplest form of the convolver transducer configuration, four coded transducers are utilized. Two of them, $A_1$ and $A_2$, are in line and coded according to a Golay complementary series A. The other two, $B_1$ and $B_2$, are in line, parallel to transducers $A_1$ and $A_2$, and are coded according to the series B, the complement of A. The coded transducers $A_1$ and $A_2$ launch waves in opposite directions. Similarly, the transducers $B_1$ and $B_2$ launch waves in opposite directions. The transducers $A_1$ and $A_2$ are used as the launch transducers of a convolver, as are the transducers $B_1$ and $B_2$. The output of the A convolver is added to the output of the B convolver. The first input is applied to both $A_1$ and $B_1$, and the second input is applied to both $A_2$ and $B_2$.

The output of the first convolver is the convolution of the two inputs convolved with the autocorrelation function of the Golay complementary series A. The output of the second convolver is the convolution of the two inputs with the autocorrelation function of the Golay complementary series B. The sum of the two outputs is the convolution of the two inputs convolved with the sum of the autocorrelation function of A with the autocorrelation function of B. But the sum of the two autocorrelation functions is a multiple of the Dirac delta function, and hence the final output is a multiple of the convolution of the two inputs.

A correlator transducer configuration may be obtained by letting transducers $A_1$ and $A_2$ launch waves in the same direction, and letting transducers $B_1$ and $B_2$ launch waves in the same direction.

Background theory, however describing shear waves in a bulk material instead of surface waves, as in this invention, is discussed in an article by C. F. Quate and R. B. Thompson in the 15 June 1970 issue of "Applied Physics Letters," Vol. 16, No. 12, pages 494–496, in an article entitled "Convolution and Correlation in Real Time with Nonlinear Acoustics."

More than two acoustic paths may be utilized. Transducer codings may be made equal to the codings derived from orthogonal matrices described in the patent which issued on 27 Mar. 1973, entitled "Surface Wave Multiplex Transducer Device with Gain and Sidelobe Suppression," having U.S. Pat. No. 3,723,916.

The cancellation of temporal sidelobes in the impulse response of a cross-convolver or cross-correlator results through the use of several acoustic paths and transducers such that the sum of the autocorrelation functions of their weight functions is a multiple of the Dirac delta function. This is a key feature of the invention.

OBJECTS OF THE INVENTION

One object of the invention is to provide a transducer device which combines the gain of a periodic transducer with the bandwidth of a short transducer.

Another object of the invention is to provide a transducer device having a large output as well as a large time-bandwidth product.

Still another object of the invention is to provide a transducer device able to quckly process complicated signals.

Yet another object of the invention is to provide a transducer device which may be implemented on high-coupling material, since there is automatic cancellation of the spurious voltages which would ordinarily be generated by multiple acoustic-to-electric and electric-to-acoustic conversions.

Other objects, advantages, and novel features of the invention will become apparent from the following detailed description of the invention, when considered in conjunction with the accompanying drawings, wherein:

BRIEF DESCRIPTION OF THE DRAWINGS

FIG. 1 is a block diagram of a simple prior art device embodying the basic interaction process.

FIG. 2 is a block diagram of a quarter-square transducer device, a simple embodiment of the invention.

FIG. 3 is a diagram of a prior art coded transducer with field-delineating electrodes.

FIG. 4 is a diagram of a transducer with weighted electrodes.

FIG. 5 is a block diagram of a more complex embodiment of the invention, a Golay-coded cross convolver, comprising two quarter-wave transducer devices in parallel.

FIG. 6 is a block diagram of another embodiment of the invention, in the form of a cross-correlator.

DESCRIPTION OF THE PREFERRED EMBODIMENTS

Before discussing the embodiments of this invention, the evolution of the invention from a prior art device shown in FIG. 1 should prove useful.

FIG. 1 shows a transducer device 10 with three transducers, two launch transducers, 14 and 16, and one integrating transducer 18, electrodeposited, or otherwise disposed upon a substrate 12. This type of prior art device has been described by L. O. Svaasand in the 1 Nov. 1969 issue of "Applied Physics Letters," Vol. 15, No. 9, pages 300–2, in an article entitled "Interaction between Elastic Surface Waves in Piezoelectric Materials."

In FIG. 1 is shown an embodiment 10 which shows what happens upon a substrate 12 when two propagating acoustic waves $z_1$ and $z_2$ interact. The transducers 14 and 16 are the means by which the acoustic waves $z_1$ and $z_2$ are launched, after transduction of the electrical input signals $x_1$ and $x_2$.

In this figure, some means for sensing the interaction of the two electric fields is required. It takes the form of a flat metallization disposed upon the substrate 12, for example, a rectangular metallic disc 18, as shown in the figure. Alternatively, interdigitated electrodes may be used for the integration process. Opto-acoustic integration may also be used.

The basic interaction takes place underneath the electrode in the crystal.

All details of the interaction are not clear. However, it may be assumed that the transducer device 10 is linear, to a first approximation. Then, the net acoustic field in the middle of the transducer device 10, at integrator 18, is the sum of the $z_1$ acoustic field and the $z_2$ acoustic field.

Now, it cannot be assumed that the relationship between the acoustic signal and the electrical signal which caused it to be generated is exactly linear.

The equation $$E = pz + qz^2 \quad (1)$$

describes a simplified model of the relation between the acoustic field and the electrical field in a non-linear piezoelectric material. If now the acoustic field $z$ itself is the sum of two terms $z_1$ and $z_2$, as in the configuration shown in FIG. 1, corresponding to two propagating waves $z_1$ and $z_2$, then the electric field $E$ contains quadratic terms. This may be seen from the equation $$E = p(z_1 + z_2) + q(z_1 + z_2)^2$$
$$= p[z_1 + z_2] + q\ [z_1^2 + z_2^2\ ] + 2q\ z_1z_2 \quad (2)$$

The $p\ [z_1 + z_2]$ term is a linear feed-through term which is not desired in a convolver. The $qz_1^2$ and the $qz_2^2$ terms are undesired quadratic terms. The only desired term in the equation is the last term, $2qz_1z_2$.

In view of the above explanation, it may be seen that it is desired to construct an embodiment including transducers which eliminates the linear feed-through and the individual quadratic terms. The only remaining term $2qz_1z_2$, is spatially integrated.

The embodiment 20 shown in FIG. 2 is the simplest form of the invention. The equations(1) and (2) discussed in relation to the transducer device 10 of FIG. 1 also relates identically to the action which takes place on the upper half of the substrate 12 of FIG. 2.

In more detail, FIG. 2 shows an acoustic surface wave device 20 comprising a substrate 12 capable of propagating an acoustic wave across its surface and two pairs of electrode structures, 14, 16, and 24, 26, disposed upon the surface of the substrate, each pair aligned parallel to the direction of wave propagation, one pair, 14 and 16, aligned parallel to the other pair, 24 and 26.

Each of the four electrode structures, 14, 16, and 24, 26, are capable of being connected to an input electrical signal, $x_1$ or $x_2$, respectively, which, upon transduction upon the surface of the substrate 12, causes an acoustic wave to propagate along the surface of the substrate. Both acoustic waves are parallel, the acoustic waves generated by the same pair of electrode structures, 14, 16, or 24, 26, propagate in the same line, either in the same direction or in opposed directions. Acoustic interaction takes place under the conditions described in the Quate and Thompson reference. If the two signals propagate in the same direction, then means must be provided so that one of the signals "catches up" to the other, for example by use of a delay line, as shown in FIG. 6.

Referring momentarily to the prior art structure shown in FIG. 3, each electrode structure 30 comprises a pair of sets, 32 and 34, of parallel, interdigitated, active electrodes, oriented in a direction perpendicular to the direction of surface wave propagation. A pair of bus bars, 32B and 34B, are at opposite ends of, perpendicular to, and connect the interdigitated electrodes, 32 and 34, one bus bar connecting some of the interdigitated electrodes, the other bus bar connecting the remaining electrodes. A third electrode structure 36 interleaves the pair of sets, 32 and 34, of active electrodes, and is generally connected, by means of the square tab 38, to a neutral, or grounding, point in equipment used with the electrode structure. One function of the third electrode structure is to shield one set of electrodes 32 from the other set 34.

Referring back to the embodiment 20 shown in FIG. 2, a pair of integrators, 18 and 28, is disposed upon the substrate 12, one for each parallel pair of electrode structures, 14, 16, and 24, 26. One integrator 18 has as its two inputs the surface wave outputs from two of the parallel electrode structures, 14 and 16; the other integrator 28 having as its two inputs the surface wave outputs from the other two parallel electrode structures, 24 and 26. Each integrator, 18 and 28, integrates the output of the two electrode structures, 14, 16, and 24, 26, which provide its two inputs.

A multiplicative interaction may be said to take place in the substrate, more exactly, in the region of the spatial integrators, the rectangles of uniform metallization, 18 and 28.

A subtraction circuit, or differencer, 29 has as its two inputs the outputs of the pair of integrators, 18 and 28, its output signal corresponding to the convolution or correlation of the two different input signals, $x_1$ and $x_2$, to the two pairs of electrode structures, 14, 16, and 24, 26, a correlation if one input signal is time-reversed with respect to the other, otherwise a convolution.

A summer is ordinarily assumed to sum two or more like parameters, while a subtraction circuit is assumed to take the difference between two parameters. However, in some cases the only difference between a summer and a subtraction circuit is the mode of connection to the circuit. Consider, for example, a transformer with three windings, two input windings and one output winding. The reversal of the polarity of one of the input windings would change the function of the transformer from that of being a summer to that of being a subtraction circuit.

In the surface wave device 20 shown in FIG. 2, wherein each of the integrators, 18 and 28, is disposed between its associated pair of electrode structures, 14, 16, and 24, 26, the signal summer is so connected that it forms a subtraction circuit 29, the surface wave device 20 thereby being a cross-convolver.

Discussing the embodiment 20 shown in FIG. 2 theoretically, one of the set of terms which forms an input, the left input, which may be called $E_U$, U for "upper," to the subtraction circuit 29 comprises the right hand terms of Eq. (2), namely, $$E_U = p\,[z_1 + z_2\,] + q[z_1^2 + z_2^2] + 2qz_1z_2 \qquad (2a)$$

Of the set of terms which enter the subtraction circuit 29 from the right-hand side, the term $z_2$ in Eq. (2*a*) is replaced by the term $-z_2$.

The corresponding equation is $$E_L = p\,[z_1 - z_2] + q\,[z_1^2 + z_2^2] - 2qz_1z_2 \qquad (3)$$

If Eq. (3) is subtracted from Eq. (2*a*), an equation corresponding to the output of the subtraction circuit 29 is obtained, namely $$E_U - E_L = 2p\,z_2 + 4qz_1z_2 \qquad (4)$$

It may be seen that most of the undesired terms are eliminated by the subtraction operation. Specifically, the quadratic terms have been eliminated, which is why the embodiment 20 shown in FIG. 2 is called a quarter-square configuration, by analogy to prior art quarter-square multipliers.

The $E_U - E_L$ difference of Eq. (4) describes the duffference between the two electric fields $E_U$ and $E_L$, before spatial integration is performed. The spatial integration takes place as follows. The presence of the uniform metallization strips 18 and 28 results in the addition of all the small electric fields underneath it, over the integration region. That is, all the local electric fields at the different points in space, under the strips 18 and 28, are added together, thereby producing an output voltage.

In more detail, each acoustic wave is a function of time and a function of space. The same applies to the electric fields generated by the acoustic waves, they also are functions of time and space. The placement of the uniform metallization strips, 18 and 28, on the substrate 12 has the result that the output at any time is the integral of the electric field with respect to space, that is, with respect to distance along the device.

So, taking the difference between the electric fields in the upper and lower channels, $E_U - E_L$, there remain the two terms in Eq. (4), namely, $2pz_2 + 4qz_1z_2$, a linear feed-through term, and a cross term involving the product of the two variables $z_1$ and $z_2$.

If the transducer coding be chosen correctly, for example, if the coding be chosen to have an unbiased code, that is, a code whose average is zero, then the linear feed-through term $2pz_2$ may be eliminated. This will occur as long as the acoustic wave luanched by the second transducer set, 24 and 28, is totally under the integration transducer, since this reduces the linear feed-through term $2pz_2$ to zero.

Any field-delineated transducer will work in any of the embodiments shown, since every transducer element in such a transducer is unbiased. A field delineated transducer is shown in FIG. 3. It includes a third, field-delineating, set of electrodes 36 placed in between the original pair of sets of electrodes, 32 and 34.

If a binary code has as many 1's as −1's, then the transducer need not be field-delineated, since it is thereby unbiased.

If a transducer have weighted elements, that is, if all distinct electrode elements are not of the same length, and the sum of the weightings is equal to zero, or to some small number, then the transducers need not be field-delineated. Weighted positive and negative codes are shown in the embodiment 40 of FIG. 4. The code shown therein, however, is not unbiased.

In the embodiment 20 shown in FIG. 2, the transducer coding could also be any broadband code. For example, a single finger pair could be used, or short periodic codes could be used. If the coding is periodic, the coding must be short or else the bandwidth will be too low to be useful.

Although not shown in FIG. 2, or FIG. 5, in order to not unneccessarily clutter up the drawings, each transducer device includes an absorber between it and the nearest edge of the substrate which is perpendicular to the propagation path to absorb the undesired signals. An absorber stripe 42 is shown in FIG. 4 on the left side of the substrate 12, and another stripe 44 is shown on the right-hand side.

The type of coding useful for this invention, in the broadest terms, must agree with this criterion: the codes must be such that the sum of their autocorrelation functions is equal to a delta function. These codes are sometimes called generalized complementary sequence codes, or generalized Golay codes. By a generalized complementary sequence set is meant a set of sequences $\{c_k\}$, $\{d_k\}$, such that $$\sum_{k=1}^{L} c_k \otimes d_k = p\delta,$$

where the symbol ⊗ denotes correlation, $p$ is a constant, and δ denotes the delta function. The generalized codes do not even have to be matched.

In its braodest form, the invention involves the use of combinations of transducers to cancel undesired correlation and undesired feed-through terms.

Assume N coded electrodes, $c_1, \ldots, C_N$, and N other coded electrodes, $d_1, \ldots, d_N$. Assume they are chosen such that the cross-correlation summing over $k$, from $k$=1 to $k$=$N$, of $c_k$ correlated with $d_k$ equals a constant multiple of the delta function.

Take the structure shown in FIG. 2 with launch transducers coded $c_k$ on the left, and launch transducers$d_k$ and $-d_k$ on the right. Now, take N such structures with $k$ = one through N. Apply a common input to all the $c_k$, labeling it X, and a common input Y to all the $d_k$. On each of the substrates, there are two integration electrodes and a differencer. Taking the outputs of all of the differencers, and summing them, completes the operation.

The above operation gives the most general form of the convolver transducer structre, that is, N quarter-square transducer devices, involving N structures of the type shown in FIG. 2.

Referring now to FIG. 5, this figure shows an embodiment 50 using Golay coded electrodes. The structure 50 shown in FIG. 5 may be shown to consist of two structures, 50A and 50B, like the structure 20 shown in FIG. 2. The electrode structures in the top and bottom halves, 50A and 50B, of FIG. 5 are similar to the structure 20 shown in FIG. 2, except that the coding in FIG. 5 is restricted to that of the codings, A and B, of the two members of a Golay complementary pair. For broad background information on Golay complementary sequences, reference is directed to the patent to the same coinventors as this invention, namely, U.S. Pat. No. 3,551,837, entitled SURFACE WAVE TRANSDUCERS WITH SIDE LOBE SUPPRESSION, which issued on 29 Dec,. 1970.

A typical Golay coding for member A could be 1, 1, 1, −1, while the coding for transducer B could be 1, 1, −1, 1. 13

A negative coding, such as −A, indicates that the coding of the individual electrodes have been reversed in comprarison of the coding A.

Given any coding +A, an effective reversed coding −A may be obtained also by reversing the polarity of the input signal, for example by generating the signal corresponding to coding +A across one-half of a center-tapped transformer, and generating the signal corresponding to the same coding +A across the other half of the same transformer. In this case, the coding of the electrodes in both cases would be identical, but the signals would be reversed in polarity.

The outputs of the upper and lower quarter-square transducer devices, 50A and 50B, go to the separate differencers 52 and 54, the outputs of which are combined in a signal summer 56. The outputs from the differencers 52 and 54 are combined in such a way as to make use of the Golay property, to produce an output which represents a true cross-convolution. The way in which this may be determined is by observing that the cancellation of linear and quadratic terms produces a bilinear device, and then noting the impulse response. If the inputs $x_1$ and $x_2$ to the Golay-coded cross-convolver 50 be impulses, the Golay coding is such that the impulse response is the sume of the A autocorrelation function and the B autocorrelation function, which adds up to a delta function, so that a true broadband cross convolution is being accomplished.

Referring now to FIG. 6, this figure shows a surface wave device 60 wherein each of the integrators 62 and 72 is disposed to one side of its associated pair of electrode structures, 64, 66, and 74, 76. The signal summer 68 is so connected that it sums its two input signals, the surface wave device 60 thereby being a cross-correlator.

In FIG. 6 the purpose of the variable delay line 78 is to provide the relative shift between the two signals required in the process of correlation.

Obviously many modifications and variations of the present invention are possible in the light of the above teachings. It is therefore to be understood that within the scope of the appended claims the invention may be practiced otherwise than as specifically described.

What is claimed is:

1. An acoustic surface wave device, suitable for use as a correlator or convolver, comprising:
- a substrate capable of propagating an acoustic wave across its surface;
- two pairs of electrode structures disposed upon the surface of the substrate, each pair aligned parallel to the direction of wave propagation, one pair parallel to the other, but not in the same line as the other pair;
- each of the four electrode structures being connectable to an input electrical signal, which, upon transduction upon the surface of the substrate, causes an acoustic wave to propagate in a path along the surface of the substrate, both acoustic waves being parallel, the acoustic waves generated by the same pair of electrode structures propagating in the same line, either in the same direction or in opposed directions, and interacting acoustically at some region in the propagating path;
- each electrode structure comprising:
  - a pair of sets parallel, interdigitated, electrodes, oriented in a direction substantially perpendicular to the direction of surface wave propagation;
  - a pair of bus bars, at opposite ends of, perpendicular to, and connecting, the interdigitated electrodes, one bus bar connecting some of the interdigitated electrodes, the other bus bar connecting the remaining electrodes;
- the four electrode structures being so coded that the sum of their autocorrelation functions is equal to a delta function;
- absorber stripes disposed at each end of the substrate, perpendicular to the direction of wave propagation, for absorbing unwanted acoustic reflections;
- a pair of integrators, disposed upon the substrate at the regions of acoustic interaction, one for each in-line pair of electrode structures;
  - one integrator having as its input the acoustic interaction of the surface wave outputs from two of the in-line electrode structures;
  - the other integrator having as its input the acoustic interaction of the surface wave outputs from the other two in-line electrode structures;
- each integrator spatially integrating an acoustic field produced by the interaction of outputs of the correspond two electrode structures; and
- a substraction circuit, having as its two inputs the outputs of the pair of integrators, and whose output signal corresponds to the convolution or correlation of the two different inputs signals to the two pairs of electrode structures, a convolution if one input signal is time-reversed with respect to the other, otherwise a correlation.

2. The surface wave device according to claim 1, wherein each of the integrators is disposed between its associated pair of electrode structures;
- the subtraction circuit is so connected that it takes the difference of the outputs of the integrators;
- the surface wave device thereby being a cross convolver.

3. The surface wave device according to claim 1, wherein
- the the spacing between adjacent electrodes connected to a common bus bar, of each of the four electrode structures, is uniform.

4. The surface wave device according to claim 1, wherein the interdigitated electrodes are weighted, so that the algebraic sum of the weightings is zero, or approximately zero.

5. An acoustic surface wave device, suitable for use as a correlator or convolver, comprising:

a susbstrate capable of propagating an acoustic wave across its surface;

two pairs of electrode structures disposed upon the surface of the substrate, each pair aligned parallel to the direction of wave propagation, one pair parallel to the other, but not in the same line as the other pair;

each of the four electrode structures being connectable to an input electrical signal, which upon tranduction upon the surface of the substrate, causes an acoustic wave to propagate in a path along the surface of the substrate, both acoustic waves being parallel, the acoustic waves generated by the same pair of electrode structures propagating in the same line, and interacting acoustically at some region in the propagating path;

each electrode structure comprising:

a pair of sets parallel, interdigitated, electrodes, oriented in a direction substantially perpendicualr to the direction of surface wave propagation;

a pair of bus bars, at opposite ends of, perpendicular to, and connecting, the interdigitated electrodes, one bus bar connecting some of the interdigitated electrodes, the other bus bar conecting the remaining electrodes;

the four electrode structures being so coded that the sum of their autocorrelation functions is equal to a delta function;

absorber stripes disposed at each end of the substrate, perpendicular to the direction of wave propagation, for absorbing unwanted acoustic reflections;

means for delaying the input signal to one of the transducers of each in-line pair so that output signals from both transducers of the in-line pair are coincident at some region in the propagating path;

a pair of integrators, dipsoed upoon the substrate at the regions of acoustic interaction, one for each in-line pair of electrode structures;

one integrator having as its input the acoustic interaction of the surface wave outputs from two of the in-line electrode structures;

the other integrator having as its input the acoustic interaction of the surface wave outputs from the other two in-line electrode structures;

each of the integrators being disposed to one side of its associated pair of electrode structures;

each integrator spatially integrating an acoustic field produced by the interaction of outputs of the corresponding two electrode structures; and a signal summer, disposed upon the substrate, and so connected that it sums its two input signals;

the surface wave device thereby being a cross-correlator.

6. The surface wave device according to claim 5, further comprising:

a third, field-delineating, electrode structure disposed upon the substrate, interposed between an interleaving the pair of sets of parallel electrodes.

7. The surface wave device according to claim 6, wherein one pair of electrode structures is coded according to the members of a Golay complementary pair; and the other pair of electrode structures is coded according to the same members of the Golay complemntary pair, with one member of one of the pairs having its coding the negative of the coding of the corresponding member of the other pair of electrode structures.

8. The surface wave device according to claim 6, further comprising:

$2N$ more pairs of parallel, coded, electrode structures, where N is one or more, each additional two pair being similar to the first-named two pairs, the electrode pairs being disposed upon the surface of the substrate, the coding of all $2N+2$ pairs of electrode structures being such that the sum of the autocorrelation functions of all of the codings is equal to a multiple of a delta function;

$2N$ more integrators, one for each additional parallel pair of electrode structures, disposed upon the substrate in the path of its associated pair of electrode structures;

$N$ more signal summers, one for each associated two pairs of electrode structures, each of whose two inputs are the outputs from the associated pair of integrators; and an output summer, whose inputs are the outputs of the $N+1$ signal summers.

9. The surface wave device according to claim 8; the electrode structures are coded according to the members of a set of generalized complementary sequences, $\{c_u\}$, $\{d_k\}$, such that $$\sum_{k=1}^{L} c_k \otimes d_k = p\delta,$$

where $\otimes$ denotes correlation, $p$ is a constant, and $\delta$ denotes a delta function.

10. The surface wave device according to claim 9, wherein the set of generalized complementary sequences is a set of Golay complementary sequences.

* * * * *